P. MacGAHAN.
ELECTRICAL MEASURING INSTRUMENT.
APPLICATION FILED MAR. 28, 1917.
1,258,032.
Patented Mar. 5, 1918.
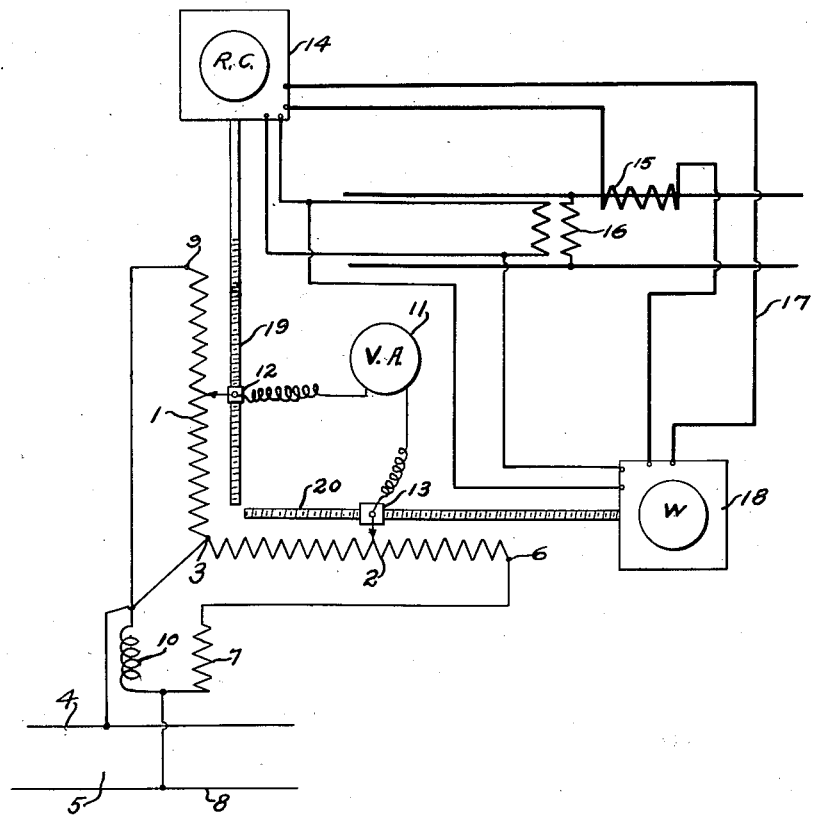
WITNESSES:
INVENTOR
Paul MacGahan.
BY
ATTORNEY

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,258,032.            Specification of Letters Patent.        Patented Mar. 5, 1918.

Application filed March 28, 1917. Serial No. 157,922.

*To all whom it may concern:*

Be it known that I, PAUL MacGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to alternating-current volt-ampere meters.

One object of my invention is to provide an instrument of the above-indicated character that shall be adapted to indicate the apparent power traversing a circuit at any instant.

Another object of my invention is to provide an apparent-power indicating instrument of the above-designated character that shall be simple to construct, and effective and efficient in its operation.

In practising my invention, I provide two resistors or potentiometer conductors that are supplied with equal constant potentials which are substantially ninety degrees out of phase with respect to each other. An indicating measuring instrument, such as a voltmeter, is operatively connected across the respective resistors or potentiometer conductors. The point of engagement of one terminal of the voltmeter with one resistor or conductor is adapted to be varied in accordance with the watts traversing the circuit and the point of engagement between the other terminal of the voltmeter and the other resistor or conductor is adapted to be varied in accordance with the reactive component of the apparent power traversing the circuit. Thus, since the voltmeter is connected across two potentials that are substantially ninety degrees out of phase with respect to each other and proportional, respectively, to the watt and reactive components of the apparent power traversing the circuit, the voltmeter will indicate the resultant of the two values or the volt-amperes traversing the circuit.

The single figure of the accompanying drawing is a diagrammatic view of an apparent-power indicating instrument embodying my invention.

The common terminal 3 of two resistors or potentiometer conductors 1 and 2 is connected to one conductor 4 of an independent single-phase constant-potential circuit 5. The terminal 6 of the conductor 2 is connected, through a resistor 7, to another conductor 8 of the circuit 5, and the terminal 9 of the conductor 1, is connected, through a reactor 10, to the conductor 8 of the circuit 5. If the resistor 7 and the reactor 10 are properly proportioned, the conductors 1 and 2 may be supplied with substantially equal potentials that are ninety degrees out of phase with respect to each other. A voltage-responsive instrument 11 is operatively connected to movable contact members 12 and 13 that are adapted to engage the potentiometer conductors 1 and 2.

A reactive-component meter 14 is operatively connected, through a current transformer 15 and a potential transformer 16, to a circuit 17, the apparent power of which is to be determined, and, similarly, a wattmeter 18 is also connected to the circuit 17. The meters 14 and 18 are provided with power-transmission devices, such as screw shafts 19 and 20, that are adapted to so actuate the movable contacts members 12 and 13, respectively, that they assume positions in accordance with the reactive and the watt components of the apparent power traversing the circuit 17.

Since the contact member 12 is moved in accordance with the reactive component and the movable contact member 13 is moved in accordance with the watt component in the circuit 17, the drop in potential, as indicated by the instrument 11, will be composed of two components that are disposed substantially ninety degrees out of phase with respect to each other, one of which is proportional to the reactive component and the other of which is proportional to the watt component in the circuit. Thus, the instrument 11 will indicate the resultant of these two components or the apparent power or volt-amperes traversing the circuit.

It do not limit my invention to the particular arrangements and structures illustrated, as many modifications may be made therein without departing from the spirit and scope of the invention as set forth in the appended claims.

I claim as my invention:

1. In a volt-ampere meter, the combination with two potentiometer conductors, the potential drops across which are substantially equal, constant and in quadrature with respect to each other, of a potential-measuring instrument, and means for varying the connections of the potential-measuring instrument to the said conductors in accordance with the watt and the reactive components in the circuit to be measured.

2. In a measuring instrument for an electric circuit, the combination with two conductors having equal but substantially ninety degrees out-of-phase potentials impressed thereon, of a voltmeter adapted to be connected to various portions of the conductors, and means for varying the connections of the voltmeter to the conductors in accordance with the watt and reactive components in the electric circuit.

3. In a measuring instrument for an electric circuit, the combination with two conductors having equal and substantially ninety degrees out-of-phase potentials impressed thereon, of a voltmeter, a wattmeter for varying the position of the connection between one conductor and one terminal of the voltmeter, and a reactive-component meter for varying the position of the connection between the other conductor and the other terminal of the voltmeter.

4. In a volt-ampere meter, the combination with two conductors having substantially constant equal potentials impressed thereon, of a voltmeter adapted to be connected across various points of the said conductors, and means for varying the points of connections in accordance with the two components of the apparent power to be measured.

5. In a measuring instrument for an electric circuit, the combination with two conductors having substantially constant equal potentials impressed thereon, of means for determining the difference in potential between various points on one conductor and various points on the other conductor, of means for varying the points of connection of the potential-determining means in accordance with the two components of the apparent power traversing the circuit.

6. In a volt-ampere meter, the combination with two conductors connected to each other and supplied with substantially equal out-of-phase potentials, of a potential-responsive means, and means for varying the points of connection of the potential-responsive means to the conductors in accordance with the two components of the volt-amperes to be measured.

7. In a volt-ampere meter, the combination with two conductors connected to each other and supplied with substantially equal out-of-phase potentials, of a potential-responsive means, and means for varying the points of connection of the potential-responsive means to the conductors in accordance with the watt and reactive components of the volt-amperes to be measured.

8. The combination with two movable elements actuated respectively in accordance with the watt and reactive components in a circuit to be measured, of a voltmeter the terminals of which are connected to the respective movable elements, and independent sources of electromotive force adapted to coöperate with the said movable elements to cause the voltmeter to indicate a value in accordance with the apparent powers traversing the circuit.

9. A measuring instrument comprising two means actuated respectively in accordance with the watt and reactive components of the apparent power traversing a circuit to be measured, a voltmeter, and a source of electromotive force, said means being adapted to so connect the voltmeter to the source of electromotive force that the voltmeter will indicate in accordance with the volt-amperes traversing the circuit to be measured.

10. A measuring instrument comprising means actuated in accordance with the watt and reactive components of the apparent power traversing a circuit, an electro-responsive means, and a source of electromotive force, said means being adapted to so connect the electro-responsive means to the source of electromotive force that the electro-responsive means will indicate in accordance with the volt-amperes traversing the circuit to be measured.

In testimony whereof I have hereunto subscribed my name this 22nd day of March, 1917.

PAUL MacGAHAN.